…

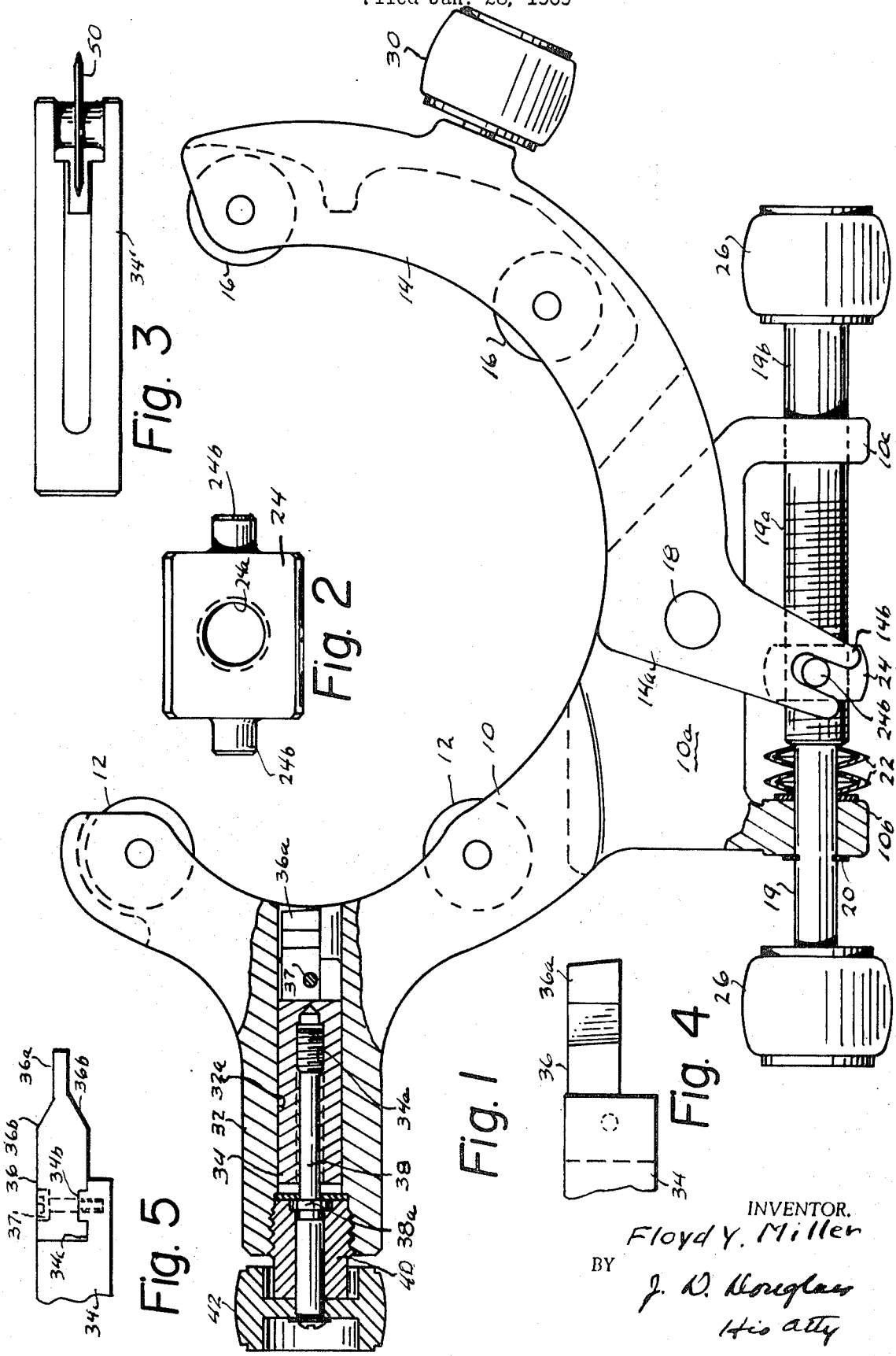

United States Patent Office 3,608,194
Patented Sept. 28, 1971

3,608,194
PLASTIC PIPE CUTTER
Floyd Y. Miller, Elyria, Ohio, assignor to
Emerson Electric Co., St. Louis, Mo.
Filed Jan. 28, 1969, Ser. No. 794,614
Int. Cl. B23d 21/08, 21/10
U.S. Cl. 30—94         1 Claim

ABSTRACT OF THE DISCLOSURE

A pair of arcuate cutter frames which carry rollers for engagement with the periphery of a pipe are hingedly connected to each other. Screw and spring means is connected to the frames adjacent the hinge to swing the two frames toward each other and into engagement with the pipe to be cut. One of the frames has a guide in which a holder that carries a cutter bit or blade is slidably mounted. Screw means is provided to adjust the cutter bit or wheel into engagement with the pipe. The pipe is cut by rotating the tool around the pipe and advancing the cutter bit or blade into the pipe.

This invention relates to pipe cutters and more particularly to a pipe cutter for the cutting of plastic pipe.

With the advent of the use of plastic pipe or tubing in the industry, it has become necessary to provide means for cutting the pipe. Due to the character of the pipe, which is highly flexible, the use of conventional pipe cutters is made difficult. Ordinary pipe cutters have a tendency to cut a spiral groove. In addition the pipe does not necessarily retain its circular cross section, and means must be provided to help it hold its correct formation and/or to follow closely the contour as it may exist during the cutting operation. In particular, the ordinary cutter wheels have a tendency to displace the material adjacent the places where it is cut leaving a flange extending inwardly and/or outwardly which must be removed, particularly the outside flange, to enable it to be assembled with couplings or other devices. In addition the extra thickness of the wall of plastic pipe, if cut with a cutter wheel, would require a wheel of relatively large diameter, which is undesirable. Although iron pipe may be reamed to remove the flange, a reamer is not as effective in plastic pipe due to the softness of the material. The above is particularly true in connection with plastic pipe of the larger diameters, i.e., 3½" to 7".

By the present invention, a pipe cutter has been made which can cut plastic pipe in a wide range, i.e., from 3½" to 7" in diameter. It will be appreciated that the tool can be made according to the invention which will cut a range of smaller diameter pipe or even larger diameter, should it be desired. The cut made is a clean cut without any flange and square with the axis of the pipe making it unnecessary to perform any reaming operation after the cut is made. In addition, when a cutter bit is used, it can be designed to chamfer the pipe at the same time it is cut without the need for an extra operation.

Still other advantages of the invention and the invention itself will become more apparent from the following description of several embodiments thereof, which description is illustrated by the accompanying drawings and forms a part of the specification.

In the drawings:
FIG. 1 is a view partly in elevation and partly in section of the device of the invention with certain parts shown by dotted lines;
FIG. 2 is an elevational view of a trunnion block removed from the cutter;
FIG. 3 is a plan view of a modified form of cutter blade;
FIG. 4 is a fragmentary side view of a blade holder with a bit type of blade; and
FIG. 5 is a similar view rotated 90°.

Briefly, the invention contemplates a pipe or tubing cutter which uses a pair of arcuate frame sections hingedly secured together adjacent their one ends and with adjusting means connected to the frames at the hinge point to move their free ends toward and from each other. Each frame section carries a pair of rollers for engagement with the periphery of a pipe. The adjusting means also includes spring means in conjunction therewith which allows the frames a certain degree of movement against the spring pressure to enable the frames to follow the contour of a pipe should it depart from a circular cross section. The cutting means includes an independently adjustable bit controlled by a screw feed means which may be fed into the periphery of the pipe. The bit and its holder may be replaced by a holder that carries a cutter wheel.

More specifically, and as best shown in FIG. 1, the one frame includes a first generally arcuate member having a portion 10 of generally U-shaped cross section which supports a pair of pipe positioning rolls 12 between spaced parallel walls. At the lower end, as viewed in the drawing, the member departs from the double wall structure and has a portion 10a which forms a yoke that has a pair of depending apertured ears 10b–10c, disposed in spaced parallel alignment with each other.

The second frame member 14 is likewise generally arcuate in form and of U-shaped cross section and supports a pair of pipe back-up rolls 16. The lower extremity, as viewed in FIG. 1, provides a pair of spaced parallel walls 14a which are disposed on opposite sides of the part 10a of the first frame and is pivotally secured thereto by a pivot pin 18. The walls 14a extend radially from the pivot pin and at the end provide a pair of bifurcated portions 14b.

Means for swinging the frame 14 relative to the frame 10 about the pivot 18, to bring the rolls 12–16 into contact with the periphery of a pipe, is provided and comprises a shaft having a first smooth part 19 journalled in the ear 10b. Inwardly of the part 19 the shaft has an enlarged threaded part 19a, which may be left-hand threads, that extends to a point spaced slightly from the ear 10c. The threaded part 19a, which may be left-hand threads, that journalled in the ear 10c. A lock ring 20 disposed in a groove in the shaft on the part 19 holds the shaft against movement to the right and pairs of spring rings or washers 22 disposed around the shaft and between the ear 10b, and the shoulder formed by the enlarged part 19a hold the shaft against movement in the other direction but permit a certain amount of movement to the left against the pressure of the springs.

A connection between the shaft and the arms 14b is provided and comprises a trunnion body 24, FIG. 2, of generally rectangular formation having a threaded opening 24a therethrough which is in threaded engagement with the threaded part 19a of the shaft. A pair of trunnion pins 24b extend outwardly from opposite ends of the body, which is slidably disposed between the arms of 14a, into the forked ends of 14b. The opposite ends of the shaft 19 are of reduced diameter and have operating knobs 26 secured thereon. The knob to the right may be omitted if desired.

It will be apparent that, with the frame parts in an open position, as shown in FIG. 1, the device may be placed around a pipe or a pipe inserted between the frame parts, after which either one of the knobs 26 may be rotated which causes the trunnion member 24 to move from left to right, from the position shown. The trunnions 24b, which are engaged in the forks 14b, cause the frame 14 to be swung about the pivot 18 toward the frame 10 until the rollers 12–16 engage with the periphery of the pipe. The device may now be rotated around the pipe by means of the knobs 30 and/or a housing 32 which extends outward from the frame part 10. Since the screw 19 is capable of limited sliding movement in the ears 10b–10c against the pressure of the spring washers 22, should the pipe be "out of round" the frame 14 may partake of a certain degree of movement relative to the frame 10, to compensate for the irregularity of the pipe.

The cutting of plastic pipe is effected by a cutter bit which is fed into the periphery of the pipe by a feed screw.

The extension 32 is provided with a bore which houses the cutter and feed screw. The bore 32a is of square cross section and a cutter support bar 34 is slidably supported therein. The bar has its end machined to provide a boss 34b and a groove 34c, FIG. 5, to receive the base end of a cutter bit 36 which is machined in a complementary fashion and held thereon by a suitable screw 37. The cutter bit is ground to provide an outer narrow cutting edge 36a with the usual rake. Backward from the edge the surfaces 36b are likewise ground to provide a cutting surface for beveling the outer edge of the pipe. The bar 34 has a threaded bore 34a in which an adjusting screw 38 is disposed. The end of the housing 32 is provided with a threaded counterbore, and a threaded bushing 40 is disposed in threaded engagement in the counterbore against a washer at the end of the counterbore, leaving a space for a shoulder or collar 38a on the adjusting screw. The screw has an extension which extends through the bushing, and has an operating knob 42 on the end. When the knob 42 is rotated, the screw 38 feeds the bit holder 34 with the bit 36 into cutting engagement with the periphery of the pipe.

It will be noted that the cutter engages the pipe at its diameter, regardless of its size, since the periphery of the pipe is supported by the positioning rollers 12, and the cutting edge of the bit is mid-way between the rollers; at the same time the pipe is held under a degree of pressure by the frame part 14 as previously described.

It will also be noted that the roller 16 which is nearest the pivot 18 is sufficiently far enough away from the pivot that on the smallest size of pipe and when the frames are closest together, this roller engages behind the pipe from the rollers 12 and thus a pipe is always supported by at least one back-up roll.

Although a cutter bit is preferred for cutting plastic pipe because it does not leave a burr or flange on the pipe due to a displacement of material, it is also contemplated that the bit holder could be replaced by a holder 34' which holds a cutter wheel, when the device is to be used on metal pipe. Such a holder is shown in FIG. 3 and is, in substance, the same as the holder for the bit except that the end is bifurcated and designed to hold a cutter blade 50.

A particular advantage of the invention resides in the fact that the rollers 12 remain in fixed relation to the diameter of the pipe and are so held by one or both of the rollers 16 on the frame 14 and thus when the tool is rotated around a pipe and the cutter bit fed into the pipe, the pipe is cut by the removal of a portion of the material at a substantially even depth around the pipe without gouging the pipe. Thus, the pipe may be severed evenly and square. It will be appreciated that the cutter bit can also be ground so that the material removed provides a perfectly square end for the pipe or a chamfered end where such an end is desired. No undesired flanges are left on the pipe at the completion of a cutting operation.

Having thus described the invention, it will be appreciated that numerous and extensive departures may be made therefrom without departing from the spirit or scope of the invention as defined by the appended claim.

I claim:

1. A tubing cutter comprising a first frame member having a pair of rolls to engage with the periphery of a tube, a second frame member hingedly connected to the first frame member and having a pair of rolls to engage with the periphery of a tube, means connected between the two frame members where they are hingedly connected together for swinging said frames toward each other to cause the rolls to engage with a tube to be cut, and independently operable cutting means on said first frame member arranged to be positively advanced into cutting relation with the tube, said frame swinging means comprising outwardly extending projections and screw means connected between said projections and spring means between the screw means and the frame to enable one frame to move relative to the other and conform to irregularities of the tube, said tube engaging rollers on the first frame being arranged to engage with a tube at two spaced points about its periphery equally spaced from a diameter of a tube and the cutting means, and at least one of the rollers on the second frame arranged to engage in back of the tube from the rollers on the first frame.

References Cited

UNITED STATES PATENTS

| | | | |
|---|---|---|---|
| 178,617 | 6/1876 | Evarts | 30—94 |
| 1,841,251 | 1/1932 | Miller | 30—102X |
| 2,747,274 | 5/1956 | Willard | 30—97 |
| 3,408,738 | 11/1968 | Schade | 30—95 |

FOREIGN PATENTS

| | | | |
|---|---|---|---|
| 16,610 | 11/1913 | England | 30—95 |

ROBERT C. RIORDON, Primary Examiner

G. L. SMITH, Assistant Examiner

U.S. Cl. X.R.

30—102